United States Patent
Hu et al.

(10) Patent No.: US 7,046,010 B2
(45) Date of Patent: May 16, 2006

(54) MULTI-MODE MICRORESISTIVITY TOOL IN BOREHOLES DRILLED WITH CONDUCTIVE MUD

(75) Inventors: Guoyu (David) Hu, Houston, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 184 days.

(21) Appl. No.: 10/743,508

(22) Filed: Dec. 22, 2003

(65) Prior Publication Data

US 2005/0134279 A1  Jun. 23, 2005

(51) Int. Cl.
  *G01V 3/02* (2006.01)
(52) U.S. Cl. .......................................... 324/367; 324/374
(58) Field of Classification Search ............... 324/367, 324/358; 73/152.46
See application file for complete search history.

(56) References Cited

U.S. PATENT DOCUMENTS 5,049,822 A * 9/1991 Zoltan et al. ............... 324/367
5,570,024 A * 10/1996 Vail, III ...................... 324/368
6,801,039 B1 * 10/2004 Fabris et al. ................ 324/324
2002/0101242 A1 * 8/2002 Bittar .......................... 324/338
2005/0001624 A1 * 1/2005 Ritter et al. ................ 324/374

OTHER PUBLICATIONS

David P. Shattuck et al; Scale Modelling of the Laterlog Using Synthetic Focusing Methods; *The Log Analyst Jul.-Aug. 1987*; (pp. 357-369).
SPE 89$^{TH}$ Annual Technical Conference (SEP 28425); *Invasion Profiling With a Multiple Depth of Investigation Electromagnetic Wave Resistivity Sensor*; M. S. Bittar et al; Sep. 25-28, 1994; (pp. 1-23).

* cited by examiner

*Primary Examiner*—Michael Tokar
*Assistant Examiner*—Tyrone Jackson
(74) *Attorney, Agent, or Firm*—Conley Rose, P.C.

(57) ABSTRACT

A multi-mode resistivity tool measures at multiple depths into the near-borehole formation. By use of a four mode tool, measuring to four depths at the formation, a more accurate invasion zone resistivity measurement may be made than previously known. The tool itself is shown as including six concentric electrodes, although not every electrode is necessary for every mode.

33 Claims, 10 Drawing Sheets

MULTI-MODE MICRORESISTIVITY TOOL IN BOREHOLES DRILLED WITH CONDUCTIVE MUD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

In drilling a borehole in the earth, such as for the recovery of hydrocarbons or for other applications, it is conventional practice to connect a drill bit on the lower end of an assembly of drill pipe sections which are connected end-to-end so as to form a "drill string." FIG. 1 includes a drilling installation having a drilling rig 10 at the surface 12 of a well, supporting a drill string 14. The drill string includes a bottom hole assembly 26 (commonly referred to as a "BHA") coupled to the lower end of the drill string 14. The BHA includes the drill bit 32, which rotates to drill the borehole. As the drill bit 32 operates, drilling fluid or mud is pumped from a mud pit 34 at the surface into the drill pipe 24 and to the drill bit 32. After flowing through the drill bit 32, the drilling mud rises back to the surface via an annulus between the outside of the drill pipe and the borehall wall, forming a mud column. The drilling fluid that travels all the way to the surface is collected and returned to the mud pit 34 for filtering. In drilling a well, due to the hydraulic pressure of the mud column in the borehole, the formation zone that is immediately behind the borehole wall is "flushed", which means that formation fluid contained in the rock pores is displaced to some degree by the mud filtrate. The mud, in the process of filtering into the formation, also tends to leave a mudcake on the wall of the hole.

Modern oil field operations demand a great quantity of information relating to the parameters and conditions encountered downhole. Such information typically includes characteristics of the earth formations traversed by the wellbore, in addition to data relating to the size and configuration of the borehole itself. The collection of information relating to conditions downhole, which commonly is referred to as "logging," can be performed by several methods.

Logging has been known in the industry for many years as a technique for providing information regarding the particular earth formation being drilled or that has been drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface, and control signals from the surface to the sonde. In accordance with conventional techniques, various parameters of the earth's formations are measured and correlated with the position of the sonde in the borehole, as the sonde is pulled uphole.

Designs for measuring conditions downhole and the movement and the location of the drilling assembly, contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term LWD will be used generically with the understanding that the term encompasses systems that collect formation parameter information either alone or in combination with the collection of information relating to the position of the drilling assembly.

Ordinarily, a well is drilled vertically for at least a portion of its final depth. The layers, strata, or "beds" that make up the earth's crust are generally substantially horizontal, such as those labeled 20, 21, and 22 in FIG. 1. Therefore, during vertical drilling, the well is substantially perpendicular to the geological formations through which it passes. A sudden measured change in resistivity by a resistivity tool generally indicates the presence of a bed boundary between layers. For example, in a so-called "shaley" formation with no hydrocarbons, the shaley formation has a very low resistivity. In contrast, a bed of oil-saturated sandstone is likely to have a much higher resistivity.

A number of regions can be defined in and around the borehole. Referring to FIG. 11, the area inside the wellbore contains drilling mud and has a resistivity of Rm. The mudcake has a resistivity of Rc. The region of the formation behind the borehole wall invaded by drilling fluid, also referred to as the flushed zone, has a resistivity of Rxo.

The resistivity of the flushed zone (Rxo), is of petrophysical importance. For example, the resistivity of the flushed zone is useful in estimating the movability of formation hydrocarbon. Therefore, an accurate Rxo value with a reasonably large dynamic range is desirable for successful well log interpretations. A device for measuring flushed zone resistivity should measure only a very shallow depth immediately behind the borehole wall (to ensure measurement at Rxo). It also should be immune to borehole rugosity or mudcake effect.

Currently, the predominant Rxo device for use in conductive mud is referred to as the Micro Spherically Focused Log (MSFL). It is a tool that provides a shallow measurement into formation behind the borehole wall. In general, an MSFL device gives a reliable Rxo reading when the resistivity ratio between Rxo and mud resistivity, Rm, is not very high, e.g. less than 10,000. But if this ratio is high, e.g. greater than 10,000, the tool becomes sensitive to the presence of mudcake or standoff effect. Under this situation, the Rxo measurement from an MSFL device may have 100% or even larger error. This has made MSFL measurement in highly resistive formation less reliable. A more accurate resistivity tool is needed, especially where this ratio is high. It would also be desirable if more accurate measurements of other formation and borehole properties could also be obtained.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

One aspect of this invention includes a tool that provides multiple microresistivity measurements into the near-borehole environment. A great deal of information is retrieved by the tool regarding the flushed zone, and an accurate flushed-zone resistivity (Rxo) value can be obtained. Mudcake thickness and its resistivity, as well as standoff distance, may also be provided.

Figure 1:
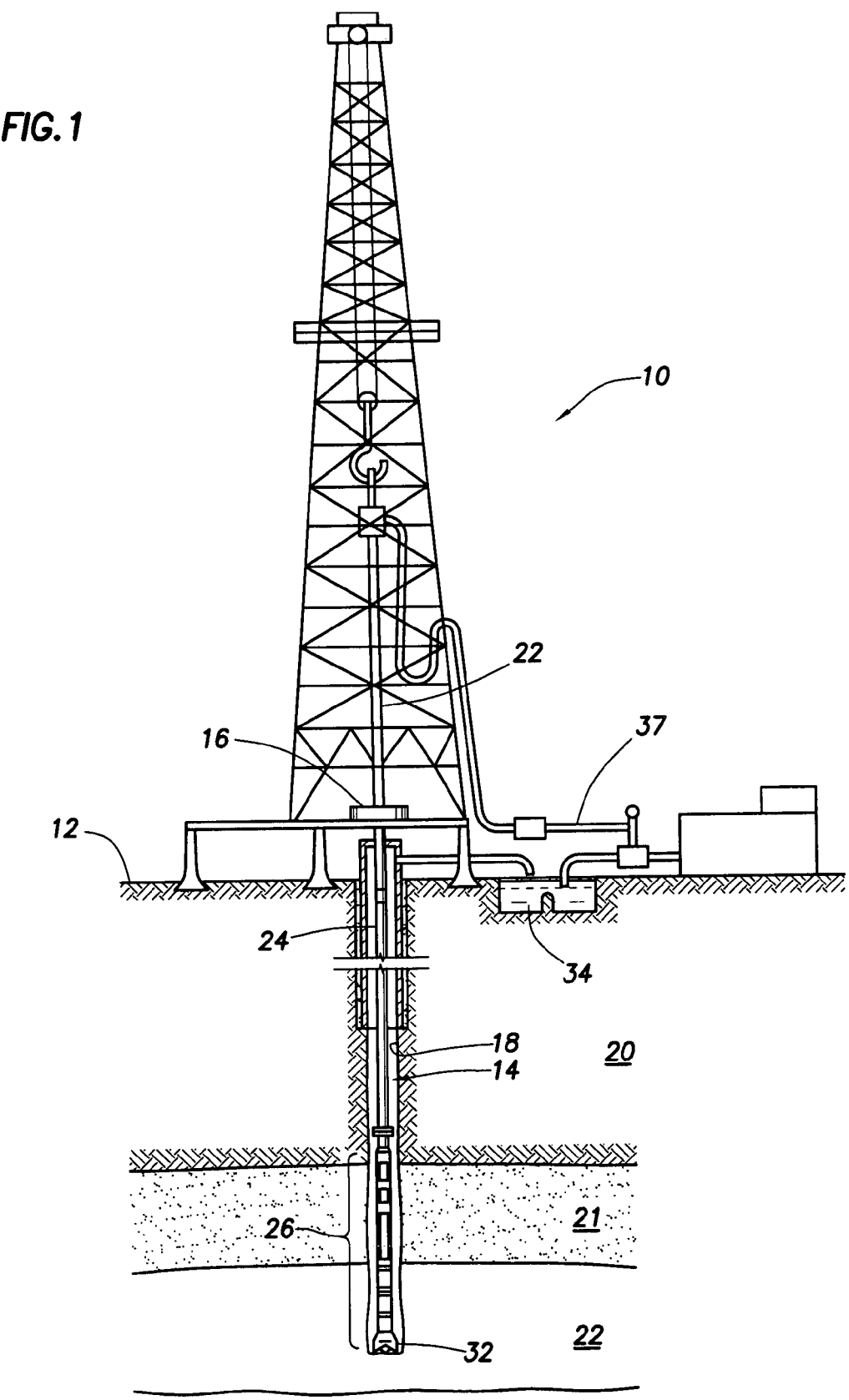
FIG. 1 is a drilling rig for a vertical well.
Figure 2:
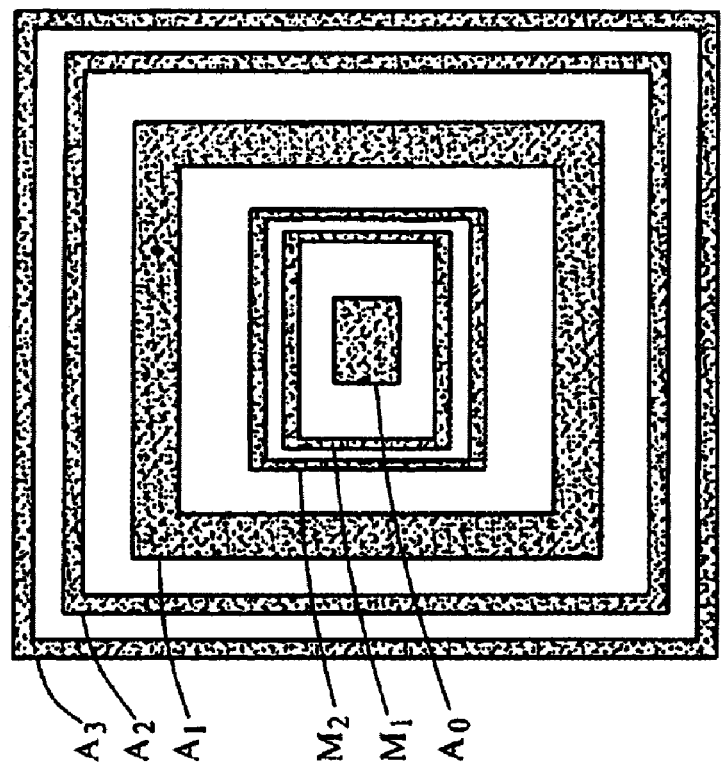
FIG. 2 is a design of a tool according to the principles of the invention.
Figure 2A:
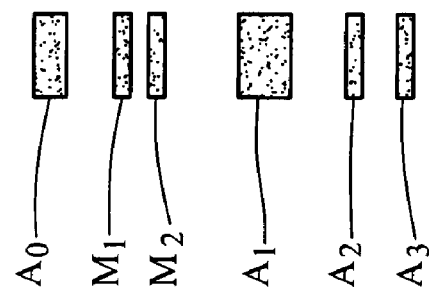
FIG. 2A is an alternate design of a tool according to the principles of the invention.

A microresistivity tool design according to one embodiment of the invention is illustrated in FIG. 2. The microresistivity tool shown in FIG. 2 includes six concentric electrode rings. These rings are not limited to the rectangular shapes of FIG. 2, but may be of any suitable geometry. FIG. 2A illustrates a series of six linearly arranged electrodes labeled $A_0$, $M_1$, $M_2$, $A_1$, $A_2$, and $A_3$ that would operate in an analogous manner to the resistivity tool with concentric electrodes as hereinafter described.

Referring back to FIG. 2, with reference to the electrodes from the center and moving outside, electrodes $A_0$, $M_1$, $M_2$, $A_1$, $A_2$, and $A_3$ are shown. These electrodes may be embedded into an insulating pad (not shown) for use either in a wireline or in an LWD application.

One aspect of the invention is the use of a plurality of modes with the tool design shown in FIG. 2, preferably four. Each mode of the tool measures at a different depth of investigation into the flushed zone. This provides more information for the near-borehole zone. As a result, mudcake and/or standoff effect can be corrected for and a more accurate Rxo value can be provided by using an inversion method.

Figure 3:
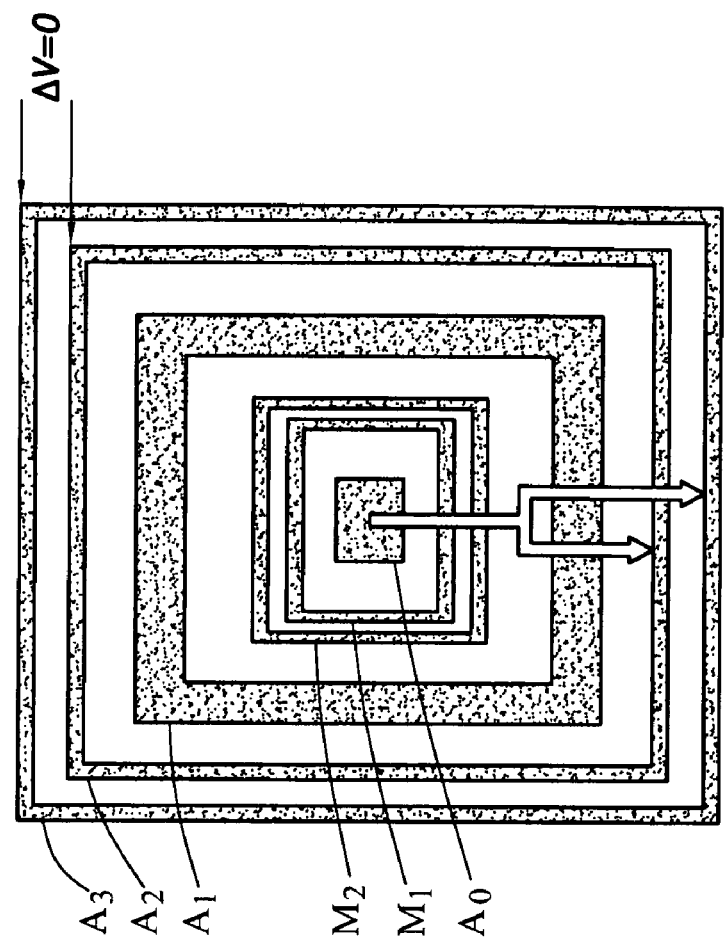
FIG. 3 shows a first mode to use the tool design of FIG. 2 to investigate a very shallow distance into the invaded zone.

A first mode of employing the design of FIG. 2 is shown in FIG. 3. This mode has a very shallow depth of investigation. In the mode of FIG. 3, electrodes A2 and A3 are short circuited and used as a current sink. Current source is electrode A0 so that current flows from electrode A0 to electrode(s) A2 or A3. A voltage measurement is taken at electrode M1. Apparent resistivity for this mode is given by $$Ra = K1 * VM1/I, \quad (1)$$

where Ra is apparent resistivity, K1 is a tool constant for mode 1, VM1 is voltage at M1 referenced from a remote electrode (e.g. 100 ft from the tool in the tool string), and I is the total current injected from electrode A0.

Figure 3B:
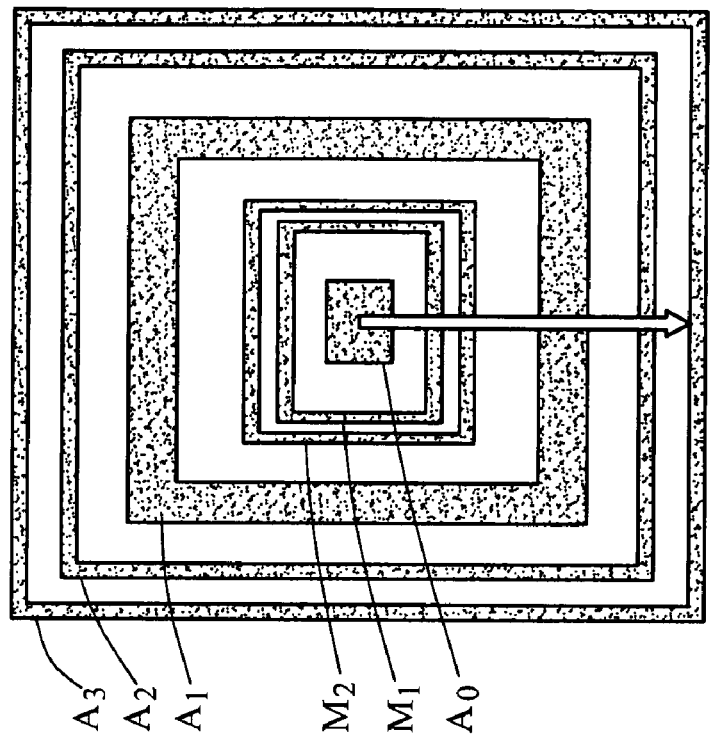
FIGS. 3A and 3B show alternate methods to that shown in FIG. 3 to investigate a very shallow distance into the invaded zone.
Figure 3A:
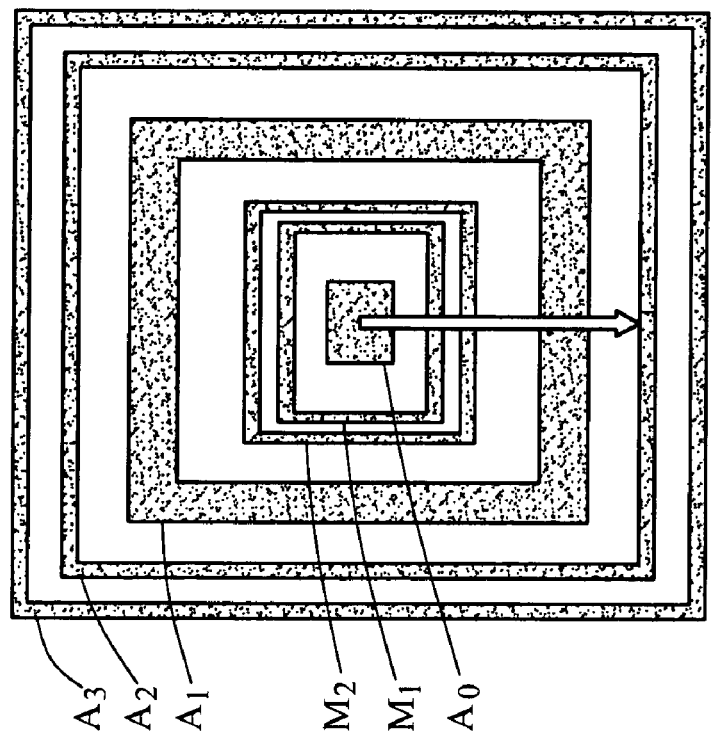

Alternately, without short circuiting A2 and A3 together, A2 or A3 can be used individually as the current return as shown in FIGS. 3A and 3B.

Figure 4:
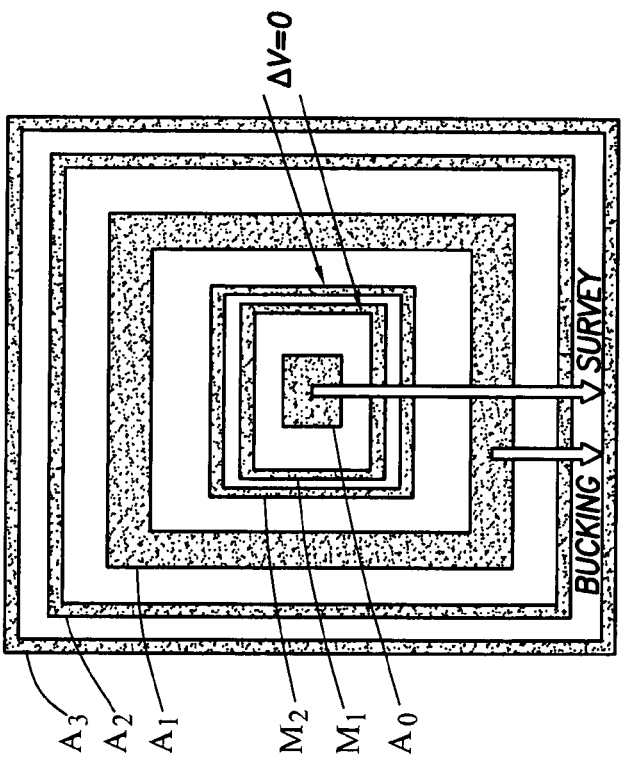
FIG. 4 shows a second mode to use the tool design of FIG. 2 to investigate a shallow distance into the invaded zone.

A second mode of employing the design of FIG. 2 is shown in FIG. 4. This mode has a shallow depth of investigation, at a depth of investigation deeper than the very shallow depth of mode 1 but shallow nonetheless. As shown in FIG. 4, a survey current (current I_survey) is injected from electrode A0 and returns to electrode A3. At the same time, a bucking current (I_bucking) is injected from electrode A1 and returns to electrode A3 so that voltage difference between M1 and M2 is minimized, ideally zero. Therefore, the bucking current focuses the survey current to flow perpendicularly to the borehole wall to yield better standoff tolerance and better vertical resolution.

Alternately, electrode A2, or, electrodes A2 and A3 short-circuited together, can also serve as the current return for I_survey or I_bucking. I_survey is measured at the current return electrode(s), and the voltage at electrode M1 or electrode M2 is measured as referenced from a remote electrode (e.g. 100 ft. from the tool in the tool string).

Apparent resistivity is derived by the following formula, $$Ra = K2 * VM1/I\_survey, \quad (2)$$

where K2 is tool constant for mode 2, VM1 is the voltage at voltage monitor electrode M1 or M2, and I_survey is the survey current.

Figure 5:
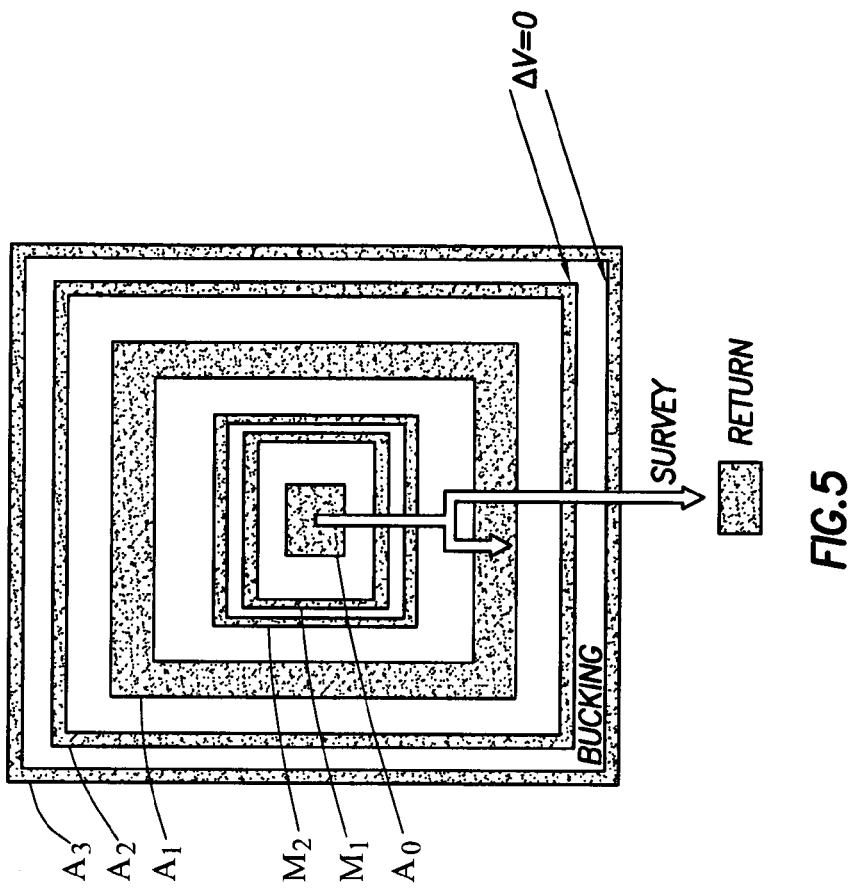
FIG. 5 shows a third mode to use the tool design of FIG. 2 to investigate a medium distance into the invaded zone.

A third mode of employing the design of FIG. 2 is shown in FIG. 5. This mode has a medium depth of investigation, at a depth of investigation deeper than the shallow depth of mode 2. In mode 3, electrodes A2 and A3 are used as voltage monitor electrodes. As shown in FIG. 5, the survey current is injected from electrode A0 and received at the return electrode which can be placed at any location along the drill string. At the same time, a bucking current is injected from electrode A0 and received at electrode A1 so that the voltage difference between electrodes A2 and A3 is small. Preferably, the voltage difference is minimized, ideally zero.

The return electrode is a current electrode located outside of the six pad electrodes. It can be the tool mandrel at the back of the tool pad, or it can be an electrode in the tool string some distance away from the pad, e.g. 20 ft away.

I_survey is measured at the return electrode, and voltage at M1 is measured referenced from a remote electrode (e.g. 100 ft from the tool in the tool string). Apparent resistivity is derived by the following formula, $$Ra = K3 * VM1/I\_survey, \quad (3)$$

where K3 is tool constant for mode 3, VM1 is voltage at voltage monitor electrode M1, and I_survey is the survey current.

Figure 6:
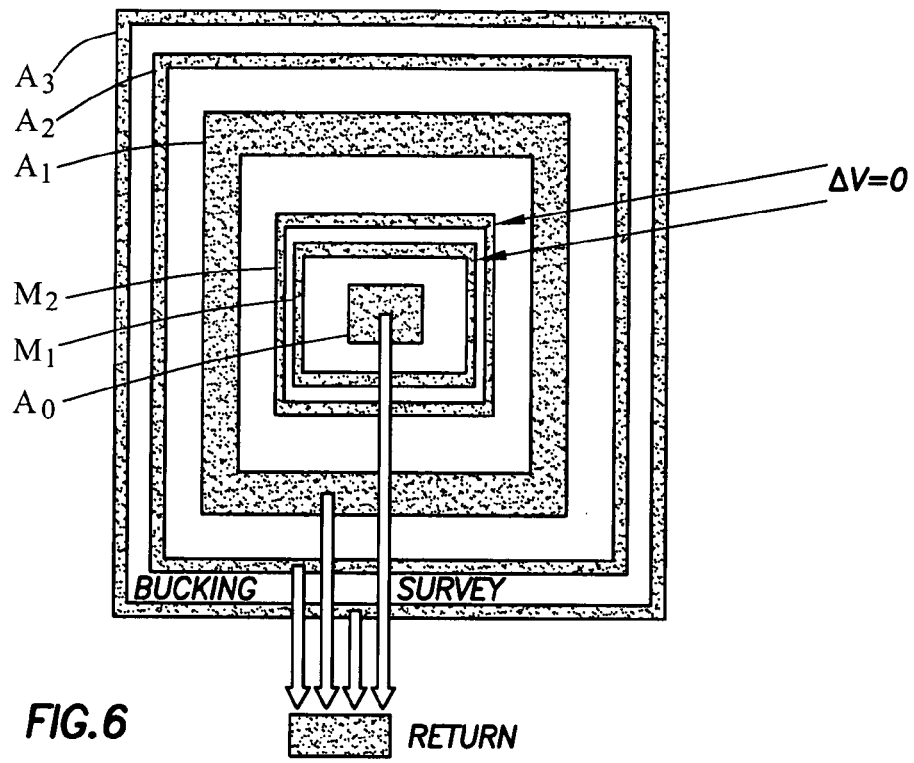
FIG. 6 shows a fourth mode to use the tool design of FIG. 2 to investigate a deep distance into the invaded zone.

A fourth mode of employing the design of FIG. 2 is shown in FIG. 6. This mode has a deep depth of investigation, deeper than the medium depth of investigation but still shallow enough that it may be assumed it is within the invaded zone. As shown in FIG. 6, in mode 4, the I_survey current is injected from electrode A0 and received at the return electrode which can be placed at any location along the drill string. At the same time, a bucking current is injected from the A1 electrode and received at the return electrode. Again, at the same time, electrodes A2 and A3 are short circuited together and they inject another flux of bucking current from A2/A3. This results in the voltage difference between M1 and M2 being small. Preferably, this voltage is minimized, ideally to zero.

I_survey should be measured, and voltage at M1 or M2 should be measured at the return electrode, as referenced from the remote electrode (e.g. 100 ft from the tool in the tool string). Apparent resistivity can be derived by the following formula, $$Ra = K4 * VM1 / I\_survey, \quad (4)$$

where K4 is tool constant for mode 4, VM1 is voltage at voltage monitor electrode M1 or M2, and I_survey is the survey current.

Figure 1A:
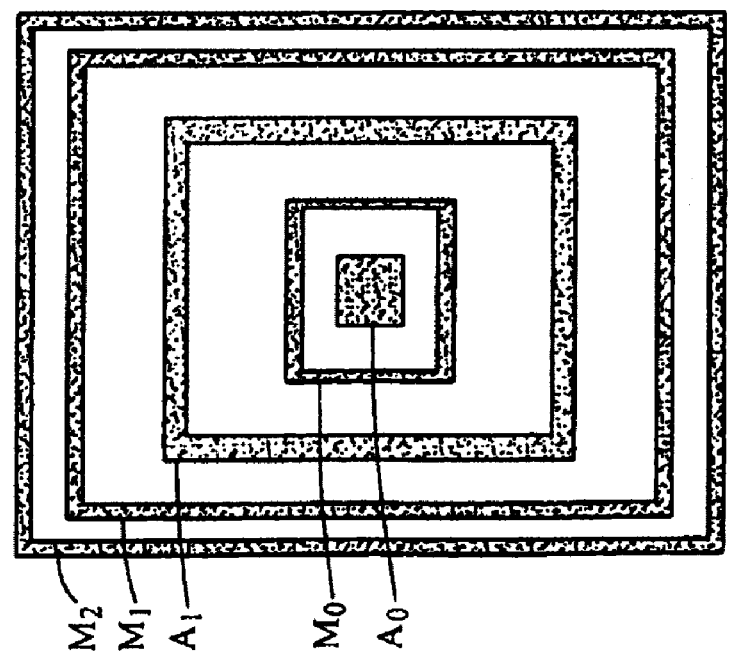
FIG. 1A is a design for a known resistivity tool.

It should be understood that one could select fewer than all the modes from the four mode tool disclosed herein to yield a three-mode tool, two-mode tool, or one-mode tool. However, it also should be understood that the design of FIG. 2 is advantageous in providing a tool capable of four depths of investigation but that includes only one more concentric electrode than the known one-mode tool design shown in FIG. 1A. This enables systems using the known one-mode tool design to be easily modified to employ the design of FIG. 2.

Alternatively, modes 2, 3 and 4 can also be achieved by using software focusing techniques. As understood by one of ordinary skill in the art, it is not necessary that the same electrode be used simultaneously for both current and voltage detection. Under the principles of superposition, the response at any point in a linear system having more than one energy source can be obtained as the sum of the response caused by each energy source acting alone. Thus, an electrode used to measure both current and voltage may be switched between current and voltage measurements (assuming the tool has not moved appreciably).

Figure 7:
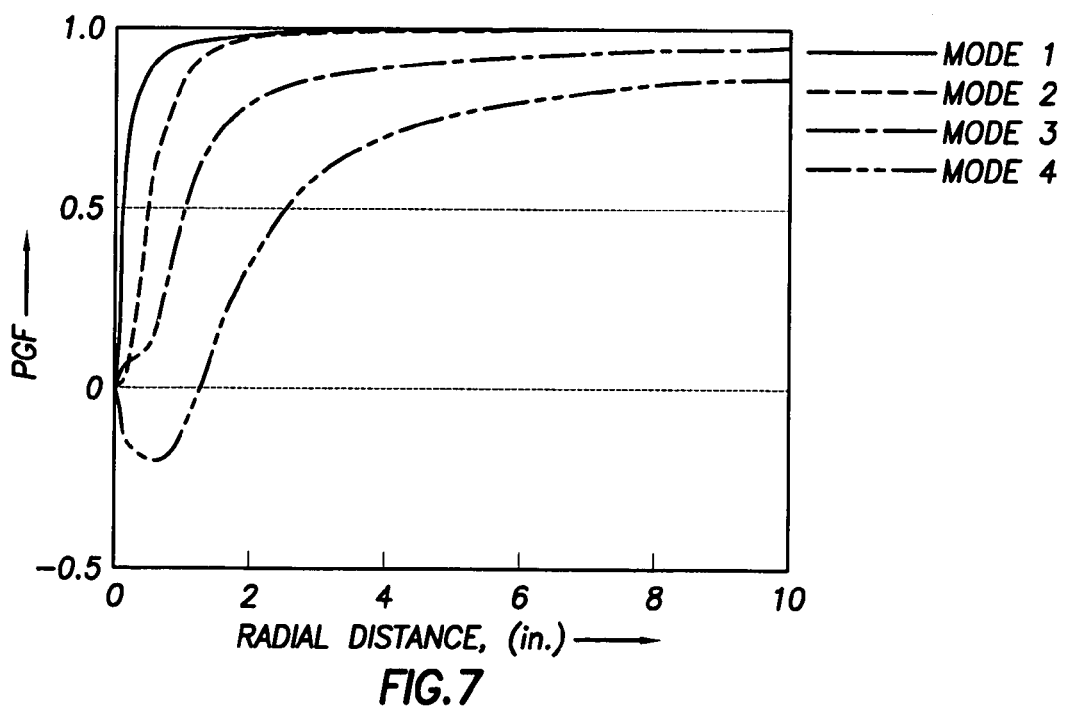
FIG. 7 shows the pseudo-geometrical factors for the tool of FIG. 2.

FIG. 7 shows the pseudo-geometric factors (PGF) for each of the four modes described above according to one embodiment of the invention. PGF is a measure of the tool's capability of how deep the tool measures into the formation. If the measurement is too shallow, then the measurement is highly sensitive to standoff/mudcake effect; if the measurement is too deep, then it may measure the resistivity of the uninvaded zone, Rt.

Along the y-axis of FIG. 7 is shown the PGF from −0.5 to 1.0. Along the x-axis is depth of investigation (radius), expressed in inches from 0 to 10. More specifically, the depth of investigation for each mode of operation may be defined from the PGF by examining where each curve crosses the 0.5 PGF level. In FIG. 7, the depths of investigation of all four modes are less than 3 inches. As can be seen by reference to FIG. 7, the depth of investigation for mode 1, the very shallow mode, corresponds to a depth just behind the borehole wall. The depth of investigation for the deep mode corresponds to somewhere between two and three inches into the formation. A feature of this pad tool is the ability to measure accurately Rxo, the flushed zone resistivity. These four modes provide a more detailed description of the near-borehole zone than the prior art, from the mudcake/standoff zone to the flushed zone.

Figure 8:
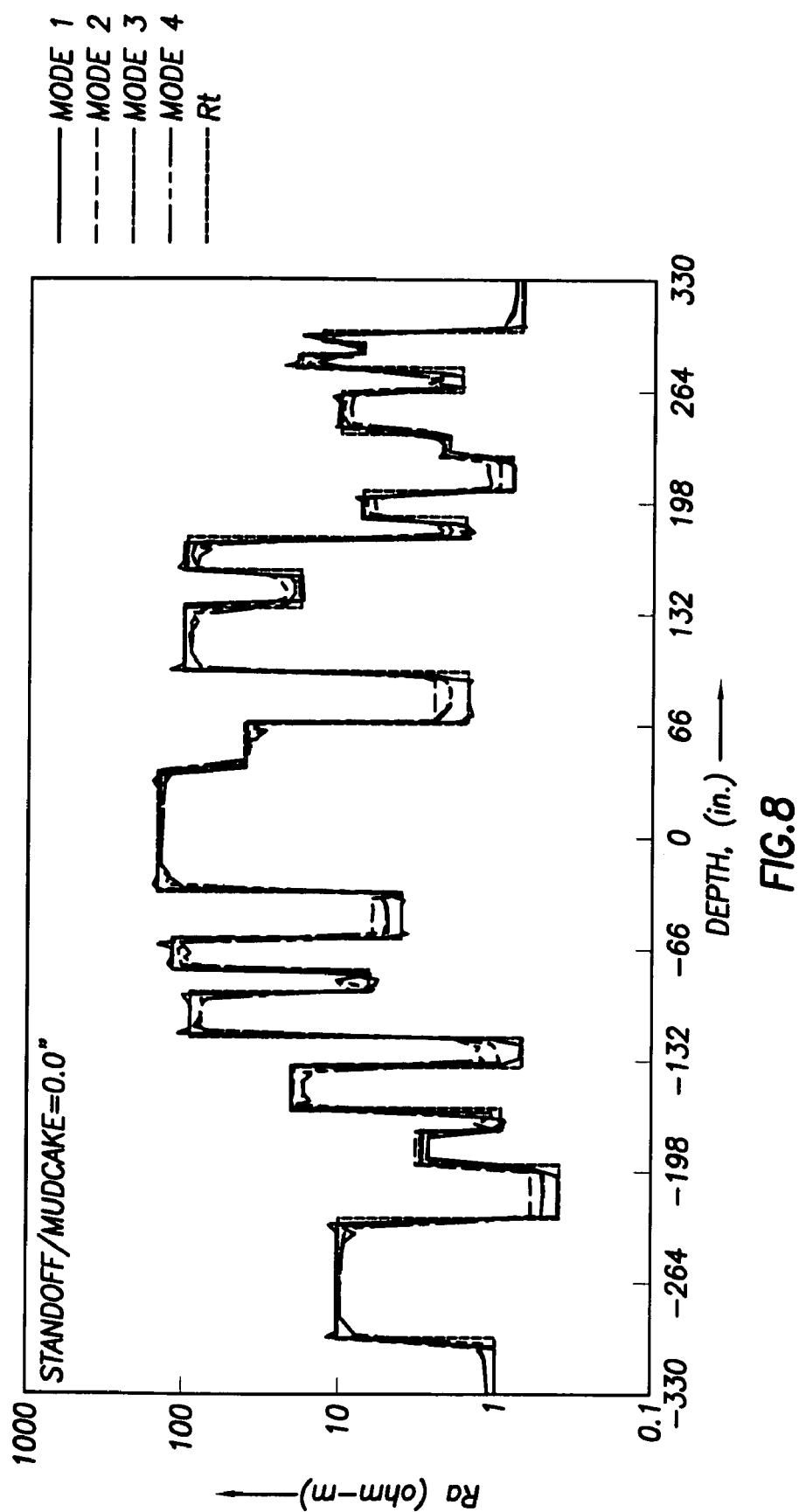
FIG. 8 shows a first Oklahoma formation response.
Figure 9:
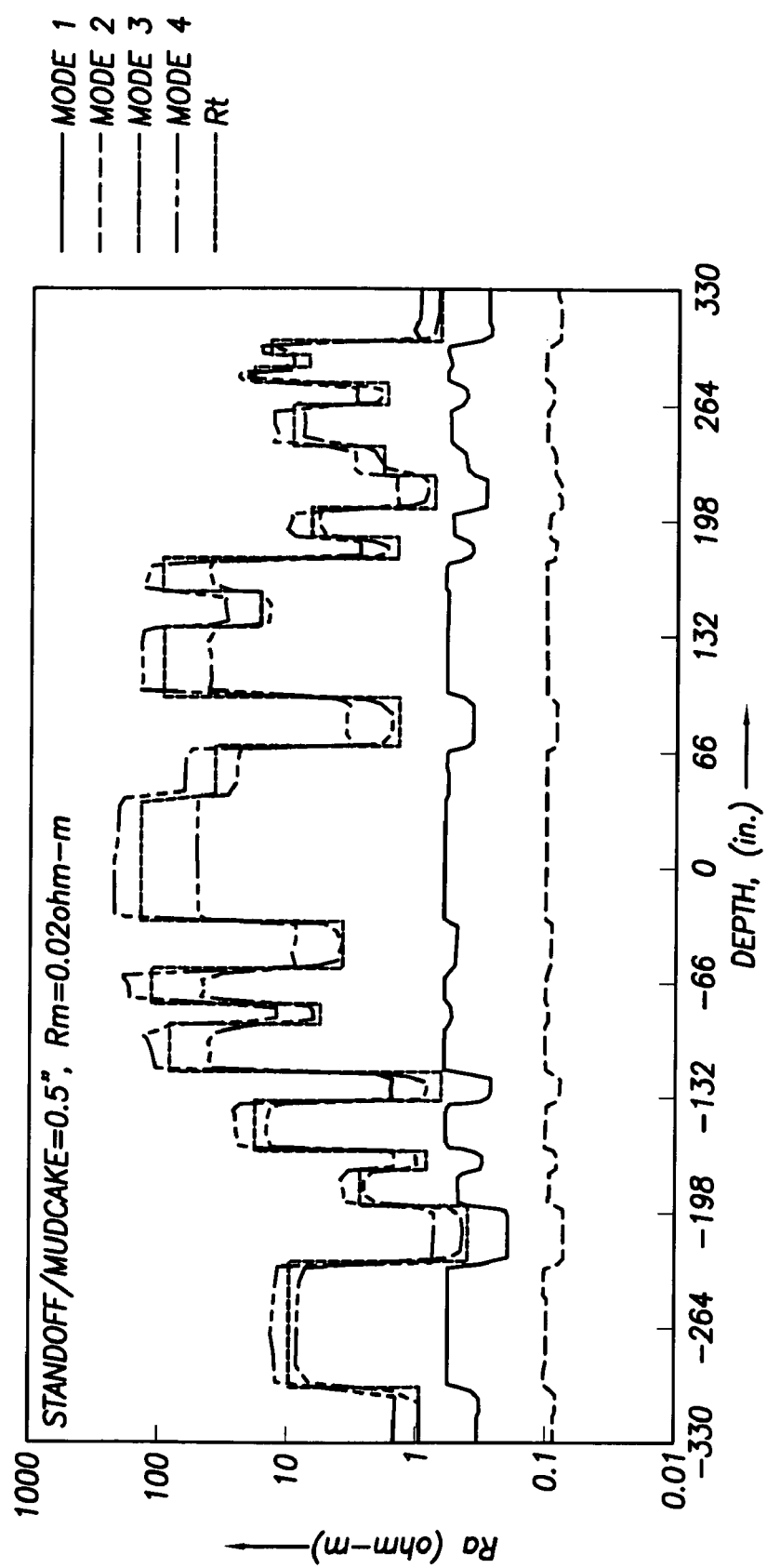
FIG. 9 shows a second Oklahoma formation response.

FIGS. 8 and 9 illustrate a modeled response for the tool of FIG. 2 in a formation. FIG. 8 illustrates the tool response where no standoff or mudcake exists. FIG. 9 illustrates the tool response where there is a standoff or mudcake of 0.5" and the resistivity of the drilling fluid or mudcake is 0.02 ohm-m. As can be appreciated by a comparison of FIGS. 8 and 9, where there is no standoff or mudcake, each of the four modes comes relatively close to measuring the true formation resistivity. Where there exists a mudcake, however, the most shallow depths of investigation (mode 1 and mode 2) are poor at providing an accurate resistivity measurement. The use of all four modes (and the differences between the resistivity measurements at the different depths of investigation) can be used, however, to determine more accurately the invaded zone resistivity.

With this multi-mode design concept, use of an inversion algorithm is convenient to carry out accurate interpretation of the large amount of information contained in multiple curves (three or four). In real time, or, as an initial estimate, mode 3 usually provides a good initial Rxo value, if mudcake/standoff effect is not severe. In post-processing for a more accurate Rxo value and mudcake/standoff information, an inversion method is chosen to solve for the parameters of interest in an iterative manner.

Inversion is one technique that enhances tool measurement accuracy. Initially, a model is generated of the formation with estimated formation properties. This model will be generated from recorded data but is unlikely to be accurate with respect to all parameters of interest. After the model of the formation is generated from recorded data, a computer model of the tool response is used to transform the estimated model of the formation into an estimated log response. This estimated log response is then compared with the actual log data. The difference between the calculated value and the raw measurement value is calculated as the misfit.

Figure 10:
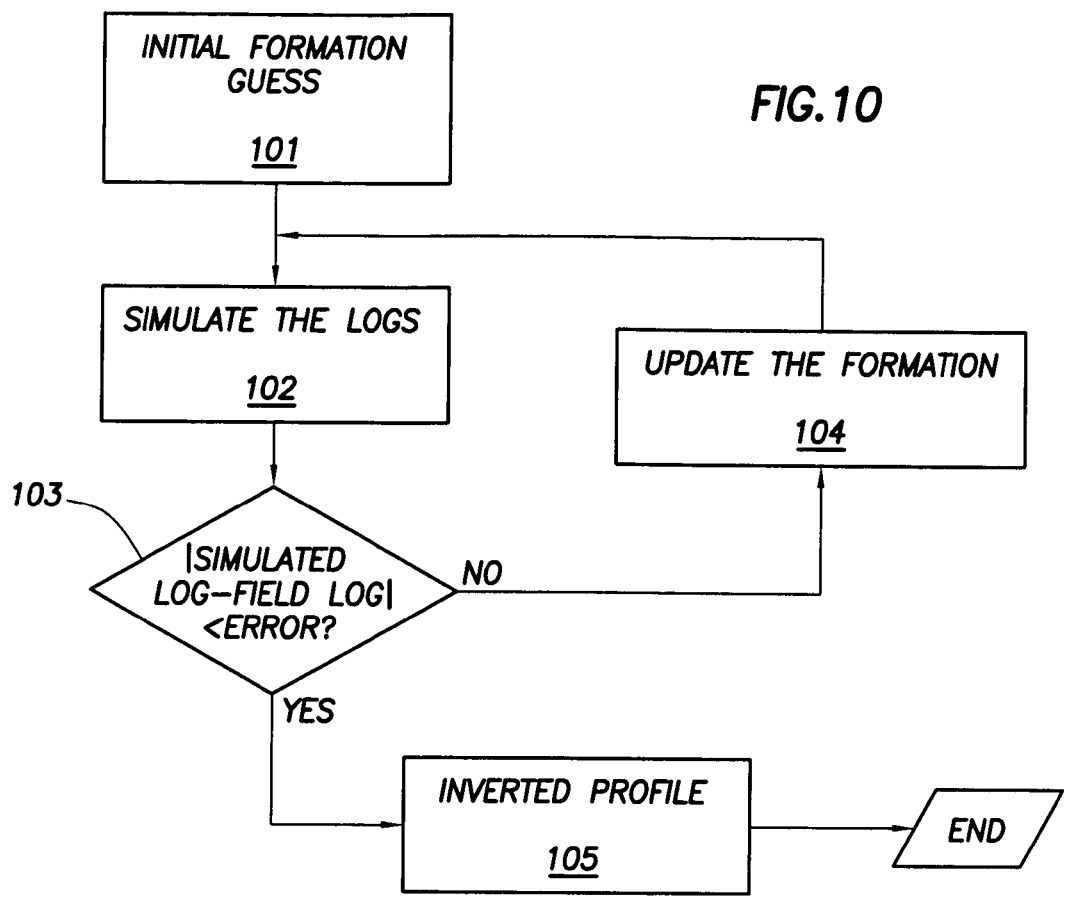
FIG. 10 is a flowchart of the inversion scheme according to the invention.

The inversion methodology is achieved by searching for a minimum point of an object function that is conventionally the misfit between the field measurements and the numerically forward computed measurements. In other words, one or more parameters of the model formation are adjusted based on the misfit of the simulated log response to the actual log data, a new comparison is made, and the process repeats. When the object function reaches its minimum point, the model used for the numerical forward computation is taken as the model underlying the field measurements. To search for the minimum point of the object function, the model parameters used for the numerical forward computation are automatically adjusted on the basis of optimization schemes. Thus, the inversion technique iteratively refines the model formation until the simulated log matches the actual log. The flow chart for a typical inversion process according to the invention is illustrated in FIG. 10. Referring to FIG. 10, an initial formation estimate is made at step 101. At step 102, the log (response of the tool) is generated. The simulated log is compared to the measured data at step 103, where it is determined whether the difference is less than an acceptable margin. If no, updated estimates at the formation properties are made at step 104. The process then begins again at step 102 with a new log being simulated. If the error between the simulated log (modeled data) and the field log (measured data) is less than the acceptable threshold at step 103, an adequately accurate formation profile has been found at step 105.

Figure 11:
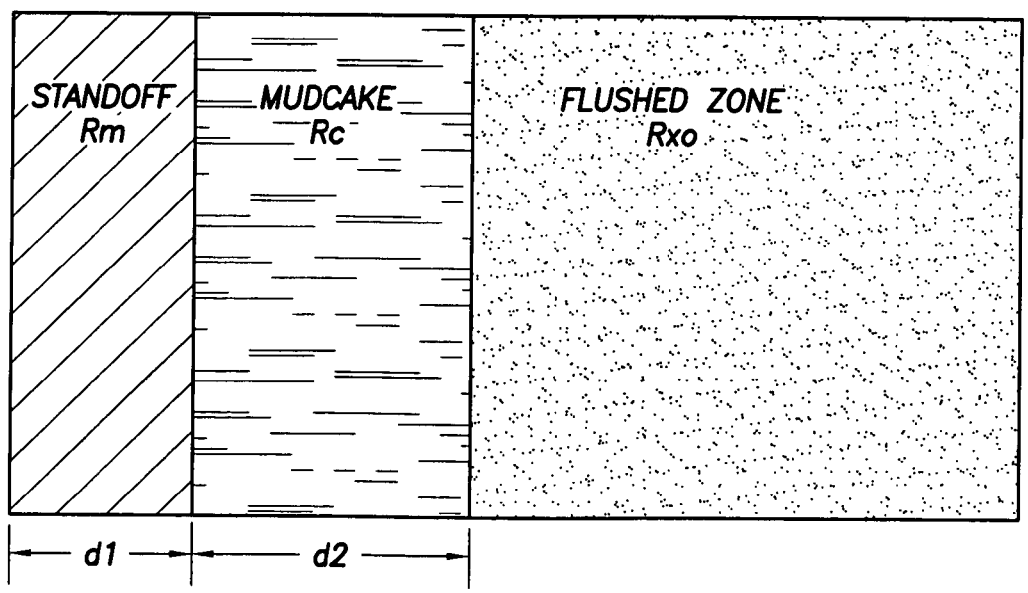
FIG. 11 shows a 1D model of the near-borehole formation.

Referring to FIG. 11, Rm, the mud resistivity, is available on the wellsite and therefore it is a known parameter. Four unknown parameters remain: standoff distance, d1, mudcake thickness, d2, mudcake resistivity, Rc, and flushed zone resistivity, Rxo. In addition, the tool preferably includes four modes, modes 1 through 4. Therefore, with four equations and four unknowns, adequate information exists to invert for these parameters. On the other hand, the model in FIG. 11 may also be simplified to eliminate a variable if it is assumed that mud resistivity is equal to mudcake resistivity.

The assumption has been made (due to the shallowness of the tool measurements), that the resistivity of the uninvaded zone has no contribution to the response of any of the modes for this tool. For the design discussed above, the design could be altered to provide a more shallow depth of investigation. Or, two unknowns may be added into to the radial 1D model of FIG. 11, the invasion radius, Ri, and the formation resistivity, Rt. A multi-mode pad tool according to principles of the invention may be run together with other tools, such as the Dual Laterolog tool, providing additional information. If the Dual Laterolog is chosen, Laterolog Shallow (LLS) and Laterolog Deep (LLD) measurements may be included in the inversion process. In that event, there exist six unknowns and six parameters, and so it is a solvable problem.

The weakness of the radial 1D model of FIG. 11 is that it neglects the shoulder bed effect. This means that for data points that are close to bed boundaries, inversion results based on this model will deviate from the true values.

Figure 12:
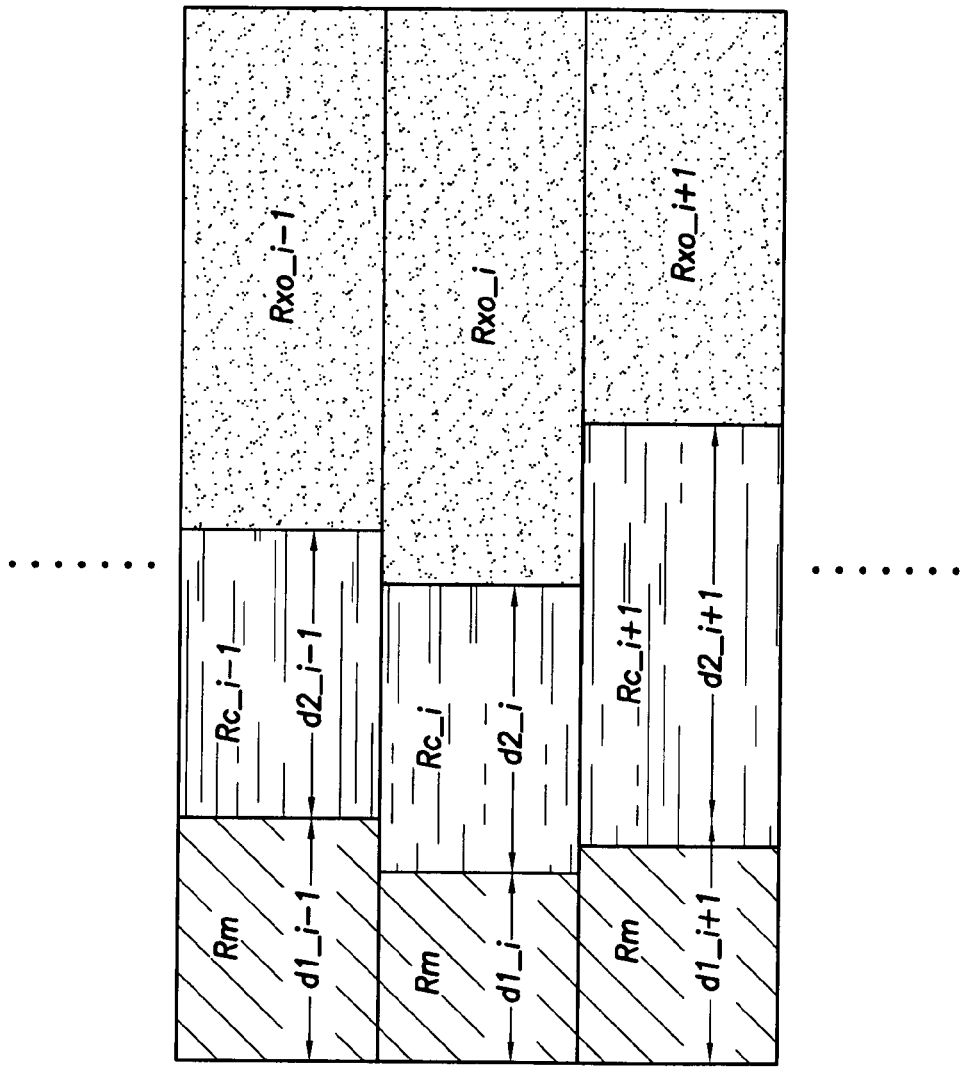
FIG. 12 shows a 2D model of the near-borehole formation.

A 2D formation model for inversion is shown in FIG. 12. In this 2D model, i is used to denote the layer number. This is a more realistic model compared with the radial 1D model when the tool is in the vicinity of one or more bed boundaries. The inversion processing based on this model will give more accurate results for the parameters if properly implemented. The weakness of the model, however, inversion based on this 2D model is more time consuming than the radial 1D model.

Just like the radial 1D model, this 2D model can be expanded to include invasion zone radius Ri and formation resistivity, Rt, if the Dual Laterolog LLS, LLD curves are taken into consideration. Also, the model can also be simplified, e.g. if mud resistivity is assumed equal to the mudcake resistivity.

With this new multi-mode Rxo device, the near-borehole zone can be explored in great detail and an accurate Rxo value can be found. In addition, mudcake information may be found by means of inversion.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A microresistivity device, comprising:
    a set of concentric electrodes, said set comprising a first electrode, a second electrode outside the first electrode, a third electrode outside the second electrode, a fourth electrode outside the third electrode, a fifth electrode outside the fourth electrode, and a sixth electrode outside the fifth electrode;
    wherein the first electrode emits a first current, and wherein a return for the first current is at least one of the fifth electrode or the sixth electrode.

2. The microresistivity device of claim 1, wherein said second electrode measures a voltage corresponding to said first current.

3. The microresistivity device of claim 2, said voltage being linearly proportionate to a resistivity of a formation surrounding said microresistivity device, said resistivity being inversely proportionate to the magnitude of said first current.

4. The microresistivity device of claim 1, further comprising:
    wherein said fourth electrode emits a second current, and wherein a return for the second current is at least one of the fifth electrode or the sixth electrode;
    wherein a magnitude of at least one said first or second currents adjust to reduce a voltage between said second and third electrodes.

5. The microresistivity device of claim 4, wherein there exists a voltage at said second electrode that is linearly proportional to a resistivity of a formation surrounding said microresistivity device, said resistivity being inversely proportionate to said first current.

6. A microresistivity device, comprising:
    a set of concentric electrodes, said set including comprising a first electrode, a second electrode outside the first electrode, a third electrode outside the second electrode, a fourth electrode outside the third electrode, a fifth electrode outside the fourth electrode, a sixth electrode outside the fifth electrode;
    a tool mandrel; and
    a seventh electrode located on the tool mandrel;
    wherein said first electrode emits a combined first current and second current, said seventh electrode being a current return for said first current and said fourth electrode being a current return for said second current, at least one of said first or second currents adjust to reduce a voltage between said fifth and sixth electrodes.

7. The microresistivity device of claim 6, wherein there exists a voltage at said second electrode that is linearly proportional to a resistivity of a formation surrounding said microresistivity device, said resistivity being inversely proportionate to said first current.

8. The microresistivity device of claim 6, wherein said voltage between said fifth and sixth electrodes is substantially zero.

9. The microresistivity device of claim 1, further comprising:
    a pad suitable to be pressed against a borehole wall,
    wherein said first electrode, said second electrode, said third electrode, said fourth electrode, said fifth electrode, and said sixth electrode are located on said pad.

10. A microresistivity device, comprising:
    a set of concentric electrodes, said set comprising a first electrode, a second electrode outside the first electrode, a third electrode outside the second electrode, a fourth electrode outside the third electrode, a fifth electrode outside the fourth electrode, a sixth electrode outside the fifth electrode; and
    a seventh electrode outside said sixth electrode,
    wherein said first electrode emits a first current, said fourth electrode emits a second current, and at least one of said fifth or sixth electrodes emits a third current, said seventh electrode being a current return for said first, second and third currents, at least one of said first, second, or third currents adjust to reduce a voltage between said second and third electrodes.

11. The microresistivity device of claim 10, wherein there exists a voltage at said second electrode that is linearly proportionate to a resistivity of a formation surrounding said microresistivity device, said resistivity being inversely proportionate to said first current.

12. The microresistivity device of claim 10, wherein said voltage between said second and third electrodes is substantially zero.

13. A microresistivity tool for measuring at multiple depths into a formation, said microresistivity tool comprising:
   a tool body having a length; and
   a set of electrodes on said tool body, said set of electrodes comprising a first electrode, a second electrode, a third electrode, a fourth electrode, a fifth electrode, and a sixth electrode arranged linearly with respect to said length;
   wherein said first electrode is a current source.

14. The microresistivity tool of claim 13, wherein said set of electrodes comprises paired electrodes that are coupled together to provide a compensated measurement.

15. The microresistivity tool of claim 13, further comprising:
   a seventh electrode not located on said tool body.

16. The microresistivity tool of claim 13, at least one of said fifth or sixth electrodes being a current return for said current, wherein said second electrode measures a voltage corresponding to said current.

17. The microresistivity tool of claim 16, said voltage being linearly proportionate to a resistivity of a formation surrounding said microresistivity tool, said resistivity being inversely proportionate to the magnitude of said current.

18. The microresistivity tool of claim 16, wherein said current from said first electrode is a first current, said fourth electrode emitting a second current, at least one of said fifth or sixth electrodes being a current return for said first and second currents, at least one of said first or second currents adjust to reduce a voltage between said second and third electrodes.

19. The microresistivity tool of claim 18, wherein there exists a voltage at said second electrode that is linearly proportional to a resistivity of a formation surrounding said microresistivity tool, said resistivity being inversely proportionate to said first current.

20. The microresistivity tool of claim 13, further comprising:
   a seventh electrode,
   wherein said first electrode emits a combined first current and second current, said seventh electrode being a current return for said first current and said fourth electrode being a current return for said second current, at least one of said first or second currents adjusted to reduce a voltage between said fifth and sixth electrodes.

21. The microresistivity tool of claim 20, wherein there exists a voltage at said second electrode that is linearly proportionate to a resistivity of a formation surrounding said microresistivity tool, said resistivity being inversely proportionate to said first current.

22. The microresistivity tool of claim 20, wherein said voltage between said fifth and sixth electrodes is substantially zero.

23. The microresistivity tool of claim 13, further comprising:
   a seventh electrode,
   wherein said first electrode emits a first current, said fourth electrode emits a second current, and at least one of said fifth or sixth electrodes emits a third current, said seventh electrode being a current return for said first, second and third currents, at least one of said first, second, or third currents adjust to reduce a voltage between said second and third electrodes.

24. The microresistivity tool of claim 23, wherein there exists a voltage at said second electrode that is linearly proportionate to a resistivity of a formation surrounding said microresistivity tool, said resistivity being inversely proportionate to said first current.

25. The microresistivity tool of claim 23, wherein said voltage between said second and third electrodes is substantially zero.

26. The microresistivity tool of claim 13, said tool body being a pad.

27. A method to determine a flushed zone resistivity behind a borehole wall formed by a borehole, comprising:
   inserting a resistivity measurement device into said borehole;
   measuring a first resistivity at a first distance from said resistivity measurement device;
   measuring a second resistivity at a second distance from said resistivity measurement device;
   measuring a third resistivity at a third distance from said resistivity measurement device;
   measuring a fourth resistivity at a fourth distance from said resistivity measurement device;
   calculating said flushed zone resistivity from one or more of said measured first resistivity, said second resistivity, said third resistivity, or said fourth resistivity, said flushed zone being a region of formation invaded by drilling fluid.

28. The method of claim 27, wherein a ratio between said flushed zone resistivity and a resistivity of said drilling fluid is greater than ten thousand.

29. The method of claim 27, further comprising:
   calculating at least one of a standoff distance, a mudcake thickness, drilling fluid resistivity, and a mudcake resistivity from said measured first resistivity, said second resistivity, said third resistivity, and said fourth resistivity, said standoff distance and said mudcake thickness being regions between said resistivity measurement device and said borehole wall.

30. The method of claim 29, wherein said calculating comprises calculating all of said standoff distance, said mudcake thickness, said drilling fluid resistivity, and said mudcake resistivity from said measured first resistivity, said second resistivity, said third resistivity, and said fourth resistivity.

31. The method of claim 27, wherein calculating is by use of inversion.

32. The method of claim 27, said microresistivity measurement device comprising at least seven electrodes.

33. The method of claim 27, further comprising:
   measuring a fifth resistivity at a fifth distance from said resistivity measurement device; and
   measuring a sixth resistivity at a sixth distance from said resistivity measurement device.

* * * * *